United States Patent
Makino et al.

(12)
(10) Patent No.: US 6,277,954 B2
(45) Date of Patent: Aug. 21, 2001

(54) METHOD OF STRIPPING FOR LATEX OF VINYL CHLORIDE PASTE RESIN, STRIPPING APPARATUS, AND VINYL CHLORIDE PASTE RESIN LATEX HAVING LOW CONCENTRATION OF RESIDUAL MONOMER

(75) Inventors: Tsukasa Makino, Akashi; Tsuyoshi Yoshida, Himeji; Toshihiko Kimura, Takasago, all of (JP)

(73) Assignee: Kaneka Corporation, Osaka (JP)

( * ) Notice: Subject to any disclaimer, the term of this patent is extended or adjusted under 35 U.S.C. 154(b) by 0 days.

(21) Appl. No.: 09/772,077

(22) Filed: Jan. 30, 2001

Related U.S. Application Data

(63) Continuation-in-part of application No. 09/656,761, filed on Sep. 7, 2000.

(30) Foreign Application Priority Data

Sep. 14, 1999 (JP) .................................................. 11-260467
Jan. 31, 2000 (JP) .................................................. 12-023058

(51) Int. Cl.$^7$ ................................ C08F 6/16; C08F 14/06
(52) U.S. Cl. ........................ 528/501; 526/344.2; 528/500
(58) Field of Search .................................... 528/500, 501; 526/344.2

(56) References Cited

U.S. PATENT DOCUMENTS 4,367,331  1/1983  Hager et al. .

FOREIGN PATENT DOCUMENTS 53-37059  10/1978  (JP) .

*Primary Examiner*—Morton Foelak
(74) *Attorney, Agent, or Firm*—Arent Fox Kintner Plotkin & Khan, PLLC

(57) ABSTRACT

A method for continuously stripping an unreacted monomer from a vinyl chloride paste resin latex, comprising the steps of continuously supplying the latex to a vacuum recovery vessel, wherein the latex is boiling with generation of foam, under the condition that the temperature of the latex to be supplied is higher than that of the latex in the recovery vessel, withdrawing a monomer gas generated in the recovery vessel through an exhaust line provided with a foam separator, contacting the foam entrained into the exhaust line with steam introduced to the exhaust line and/or the foam separator, thereby destroying the foam, and returning the resulting latex in the separator to the recovery vessel. The unreacted monomer can be efficiently recovered from the latex by a continuous operation, and defoaming can be achieved without deteriorating the quality and without lowering the productivity.

14 Claims, 1 Drawing Sheet

METHOD OF STRIPPING FOR LATEX OF VINYL CHLORIDE PASTE RESIN, STRIPPING APPARATUS, AND VINYL CHLORIDE PASTE RESIN LATEX HAVING LOW CONCENTRATION OF RESIDUAL MONOMER

CROSS-REFERENCE TO RELATED APPLICATION

This is a continuation-in-part of application Ser. No. 09/656,761 filed on Sep. 7, 2000 pending.

BACKGROUND OF THE INVENTION

The present invention relates to a method of continuous stripping of an aqueous latex of a vinyl chloride resin suitable for paste technique, and more particularly to a method for continuously stripping unreacted monomer or monomers under reduced pressure from the latex of vinyl chloride paste resin, which is easy to foam during the stripping, while defoaming the latex without deteriorating the product quality and without lowering the productivity. The present invention also relates to an apparatus suitable for the removal of unreacted monomer or monomers by continuous vacuum stripping, and a vinyl chloride paste resin latex having a low concentration of residual vinyl chloride monomer.

In general, in the production of vinyl chloride paste resins, firstly a resin latex is obtained by micro-suspension polymerization, emulsion polymerization or seed-emulsion polymerization of vinyl chloride alone or a mixture of vinyl chloride and other vinyl monomers copolymerizable therewith. For obtaining the paste resin products, the thus obtained latex is then usually spray-dried. The obtained vinyl chloride paste resin powder is dispersed in a liquid plasticizer to form a plastisol, and the plastisol is used in the paste technique.

The term "latex of vinyl chloride paste resin" or "vinyl chloride paste resin latex" as used herein means an aqueous dispersion of a vinyl chloride homopolymer or copolymer usually having a particle size of 0.1 to 10 $\mu$m prepared for the purpose of the paste technique. The latex may contain a surfactant such as an anionic surfactant or a non-ionic surfactant, as occasion demands.

In general, the vinyl chloride paste resin latex contains a large amount of unreacted monomer such as vinyl chloride. Therefore, prior to spray-drying the latex to obtain the paste resin powder, it is required to recover the unreacted monomer in a high efficiency, ideally a whole amount of the unreacted monomer, from the latex in order to reuse the monomer and in order to suppress the release of monomer into the atmosphere from the environmental point of view.

As a method for stripping an unreacted monomer from an aqueous liquid containing a vinyl chloride resin are known, for instance, a batchwise method wherein the aqueous liquid is transferred into a pressure container such as tank and the unreacted monomer is recovered under reduced pressure with heating, a method as disclosed in Japanese Patent Publication Kokoku No. 53-38187 wherein steam is blown into an aqueous polymerization reaction mixture under reduced pressure, a continuous stripping method as disclosed in Japanese Patent Publication Kokai No. 54-8693 wherein the aqueous liquid is introduced into a perforated plate column and is brought into counter current contact with steam introduced from the bottom of the column. However, if these methods are applied to latex of a vinyl chloride paste resin, a problem of foaming of the latex is encountered. That is to say, the latex contains a large amount of a surfactant in order to retain the stability, whereby vigorous foaming of the latex occurs to fill the container or column with foam and the foam is scattered into a monomer recovery pipe. The scattered foam may cause failure or trouble of equipment. Also, the recovery pipe may be filled with the foam to increase the pressure loss in the pipe, thus resulting in lowering of the recovery ability of an exhaust pump.

In order to prevent the foam generated during the monomer recovery under reduced pressure from entering into the exhaust pipe for the monomer recovery, a suitable defoaming agent can be added to a vinyl chloride paste resin latex or the flow rate of the monomer recovered can be decreased. However, the addition of defoaming agent into the latex may introduce a problem of deterioration in paste resin quality, since a large amount of the defoaming agent is required in the defoaming of such a latex and may change the physical and chemical properties of vinyl chloride paste resins, although the quality is not adversely affected by the addition of a small amount, e.g., several hundreds ppm, of defoaming agent. The decreasing the flow rate of the recovered monomer requires a long time for recovering the monomer gas, thus resulting in lowering of the productivity.

Also, it is proposed to install a foam separator in an exhaust line for the recovery of unreacted monomer from a vacuum tank, whereby the foam scattered from the vacuum tank into the exhaust line is stored to prevent the foam from entering into an exhaust recovery pipe connected to the separator. However, since the vinyl chloride paste resin latex has strong foamability and foam retainability, the foam separator is filled with foam in a short period of time and the foam may enter the recovery pipe.

Another defoaming method is also proposed in Japanese Patent Publication Kokai No. 2000-212214 wherein a foam generated in a vacuum recovery tank during vacuum stripping is defoamed by bringing the foam into contact with a cooling means provided in the space of the vacuum recovery tank or in an exhaust pipe connected thereto. This method is effective for defoaming the vinyl chloride paste resin latex. However, in case that the vacuum stripping is carried out by introducing steam to the recovery tank, there arises a problem that steam is condensed at the cooling portion to lower the solid concentration of the latex and, therefore, the productivity in spray drying of the latex in the subsequent step is lowered.

Like this, known stripping methods are not satisfactory from the viewpoint of defoaming of vinyl chloride paste resin latex or productivity. Satisfactory stripping method and apparatus suitable for vinyl chloride paste resin latexes have not been proposed.

It is an object of the present invention to provide a continuous method for stripping unreacted monomer or monomers such as vinyl chloride under reduced pressure from a vinyl chloride paste resin latex, which is a polymerization reaction mixture and is easy to foam during the stripping due to the presence of a surfactant, while defoaming without deteriorating the quality of the vinyl chloride paste resin and without lowering the productivity.

Another object of the present invention is to provide a vacuum stripping apparatus capable of recovering unreacted monomer or monomers in a high efficiency by a continuous operation from a vinyl chloride paste resin latex obtained by polymerization without causing any trouble resulting from foaming of the latex during the stripping.

A still another object of the present invention is to provide an aqueous latex of a vinyl chloride paste resin having a low concentration of residual monomer or monomers.

These and other objects of the present invention will become apparent from the description hereinafter.

SUMMARY OF THE INVENTION

It has been found that substantially the whole amount of the residual monomer in an aqueous latex of a vinyl chloride paste resin can be removed by merely supplying the heated latex to a vacuum tank, preferably in a spraying manner, so the residence time of the supplied latex in the vacuum tank can be remarkably shortened and, therefore, the stripping can be continuously carried out with ease. It has also been found that the foaming problem can be eliminated by leading foam overflowing from the vacuum tank to a foam separator through an exhaust line connected to the vacuum tank and bringing the foam with steam in the exhaust line and/or the foam separator.

Thus, in accordance with the present invention, there are provided:

(1) a method for continuously stripping an unreacted monomer from a latex of a vinyl chloride paste resin, comprising the steps of continuously supplying a vinyl chloride paste resin latex to a vacuum recovery vessel maintained under reduced pressure, the temperature of said latex to be supplied being higher than that of said latex which has been introduced to and present in said recovery vessel, boiling said latex in said recovery vessel under said reduced pressure, withdrawing a monomer gas generated in said recovery vessel through an exhaust line which is connected to the upper part of said recovery vessel and is provided with a foam separator, bringing a foam, which has generated in and overflowed from said recovery vessel toward said foam separator through said exhaust line, into contact with steam introduced to said foam separator and/or a pipe of said exhaust line, thereby destroying said foam, returning the resulting vinyl chloride paste resin latex in said foam separator to said recovery vessel, and continuously withdrawing the vinyl chloride paste resin latex from said recovery vessel;

(2) the method of item (1) wherein the pressure in said vacuum recovery vessel is from 55 to 240 mmHg;

(3) the method of item (1) or (2) wherein said steam introduced to said foam separator and/or a pipe of said exhaust line has a temperature higher than that of the saturated water vapor in said recovery vessel;

(4) the method of item (1), (2) or (3) wherein said steam introduced to said foam separator and/or a pipe of said exhaust line has a temperature higher than the saturated water vapor temperature in said recovery vessel by 10 to 50° C.;

(5) the method of any one of items (1) to (4) wherein said steam to be contacted with said overflowing foam is introduced to a pipe of said exhaust line located between said recovery vessel and said foam separator;

(6) the method of any one of items (1) to (5) wherein the exhaust velocity in a pipe of said exhaust line located between said foam separator and an exhaust pump provided to withdraw the monomer gas from said foam separator is decreased when said foam separator is filled with the foam;

(7) the method of any one of items (1) to (6) wherein said latex to be supplied to said vacuum recovery vessel is heated by a heat exchanger provided in a latex feed line;

(8) the method of any one of items (1) to (6) wherein said latex to be supplied to said vacuum recovery vessel is heated at a temperature of not more than 80° C. by a heat exchanger provided in a latex feed line;

(9) the method of any one of items (1) to (6) wherein said latex to be supplied to said vacuum recovery vessel is heated by introducing steam to a latex feed line;

(10) the method of any one of items (1) to (6) wherein said latex supplied to said vacuum recovery vessel is heated at a temperature of not more than 80° C. by introducing steam to a latex feed line;

(11) the method of any one of items (1) to (10) wherein said latex in said recovery vessel is heated by a jacket provided to said recovery vessel;

(12) the method of any one of items (1) to (11) wherein said latex in said recovery vessel is heated by introducing steam to said recovery vessel;

(13) the method of any one of items (1) to (12) wherein said latex in said vacuum recovery vessel is withdrawn therefrom, heated by contact with steam and/or a heat exchanger and then returned to said recovery vessel;

(14) a method for continuously stripping an unreacted monomer from a latex of a vinyl chloride paste resin, comprising the steps of heating a vinyl chloride paste resin latex, continuously supplying said heated latex to a vacuum recovery vessel maintained under reduced pressure, boiling said latex in said recovery vessel, withdrawing a monomer gas generated in said recovery vessel through an exhaust line which is connected to the upper part of said recovery vessel and is provided with a foam separator, bringing a foam, which has generated in and overflowed from said recovery vessel toward said foam separator through said exhaust line, into contact with steam introduced to said foam separator and/or a pipe of said exhaust line, thereby destroying said foam, returning the resulting vinyl chloride paste resin latex in said foam separator to said recovery vessel, and continuously withdrawing the vinyl chloride paste resin latex from said recovery vessel;

(15) an apparatus for stripping an unreacted monomer from a latex of a vinyl chloride paste resin, comprising a vacuum recovery vessel, an exhaust line connected to said recovery vessel to take out a monomer gas, a foam separator installed in said exhaust line, a feed line for continuously feeding a vinyl chloride paste resin latex to said recovery vessel, a heating means provided in said latex feed line to heat the latex being fed, a recovery line for continuously recovering said latex from said recovery vessel, and a steam feed line connected to a pipe of said exhaust line and/or said foam separator;

(16) the apparatus of item (15) wherein said steam feed line is connected to a pipe of said exhaust line located between said recovery vessel and said foam separator;

(17) the apparatus of item (15) wherein said heating means is heat exchanger;

(18) the apparatus of item (15) wherein said heating means is a steam feed line connected to said latex feed line;

(19) the apparatus of any one of items (15) to (18) wherein said vacuum recovery vessel is provided with a jacket for heating the latex present therein;

(20) the apparatus of any one of items (15) to (19) wherein said vacuum recovery vessel is provided with a steam feed line for heating the latex present therein;

(21) the apparatus of any one of items (15) to (20) wherein said vacuum recovery vessel is provided with a latex circulation line comprising a withdrawal line to withdraw the latex from said recovery vessel, a returning line to return the withdrawn latex to said recovery vessel, and a heating means to heat the circulated latex;

(22) the apparatus of item (21) wherein said heating means is a heat exchanger;

(23) the apparatus of item (21) wherein said heating means is a steam feed line connected to said latex circulation line; and

(24) a latex of a vinyl chloride paste resin containing at most 500 ppm of a residual monomer based on the weight of a solid matter of said latex.

BRIEF DESCRIPTION OF DRAWING

FIG. 1 is a schematic view illustrating the stripping method and apparatus of the present invention suitable for recovery of unreacted monomer or monomers from a vinyl chloride paste resin latex obtained by emulsion polymerization or the like.

DETAILED DESCRIPTION

Figure 1:
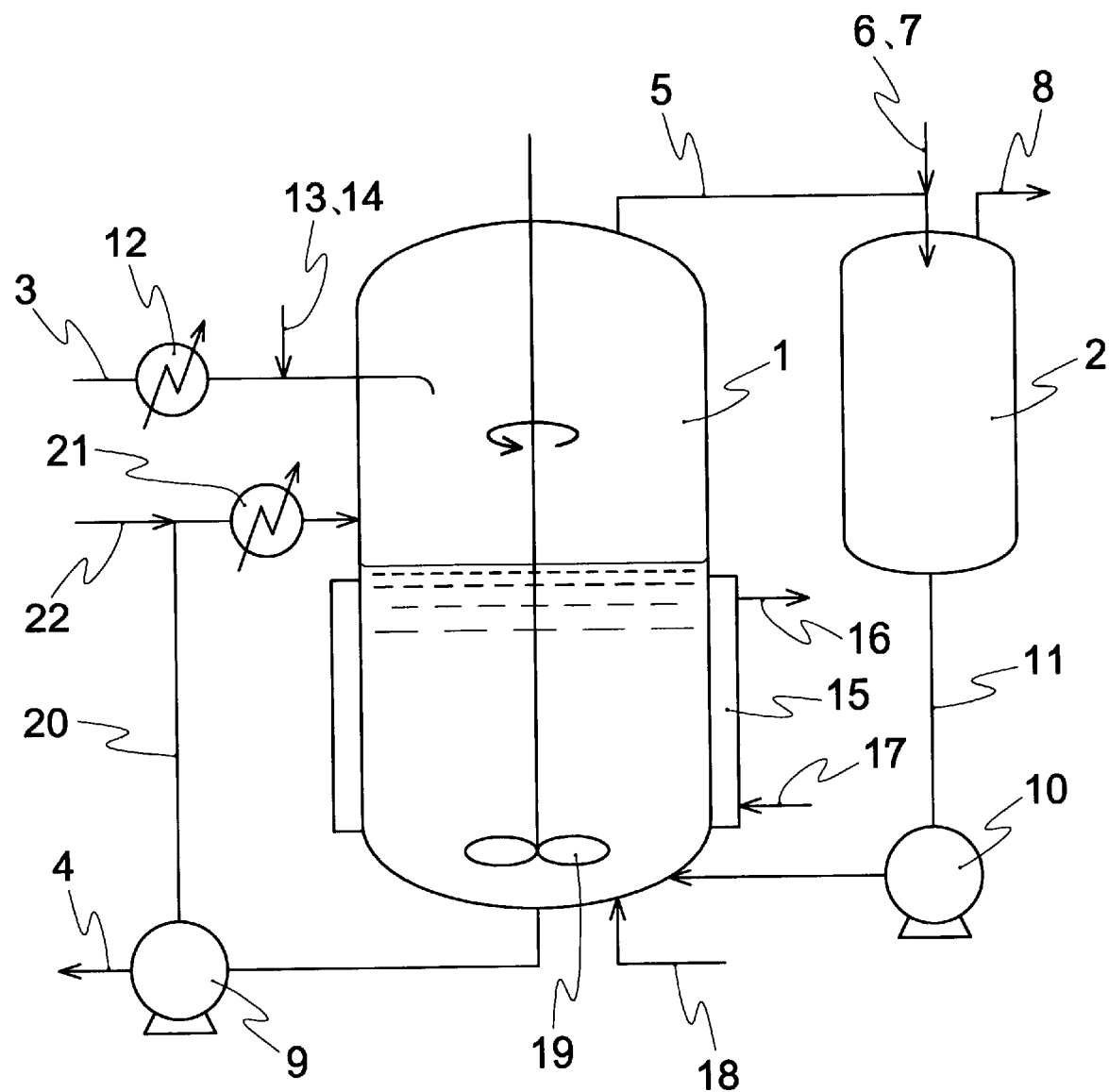

The present invention will be more particularly described with reference to the accompanying drawing, but it is to be understood that the present invention is not limited thereto.

FIG. 1 is a schematic view showing an example of an apparatus used for practicing the present invention. In the method and apparatus according to the present invention, a vinyl chloride paste resin latex obtained by a polymerization is continuously supplied into vacuum recovery vessel 1 wherein unreacted monomer such as vinyl chloride monomer remaining in the latex is removed, and the resulting monomer gas is recovered from vacuum exhaust line 5 located at an upper part of the recovery vessel 1 through foam separator 2 installed in the exhaust line 5. Foam generates during stripping the monomer from the latex in the recovery vessel 1 owing to generation of steam and a gas of the unreacted monomer from the latex. Since the foam enters into the exhaust line 5 and then into the foam separator 2, it is defoamed by contacting with steam in the exhaust line 5 and/or the foam separator 2. The vinyl chloride paste resin latex formed as a result of the defoaming which has run down in the separator 2 is preferably returned to the recovery vessel 1 without being stayed in the separator 2.

Vacuum recovery vessel 1 is not limited to a specific vessel. Any containers or vessels can be used as the recovery vessel 1 so long as they are resistant to reduction of the inner pressure to several mmHg. For example, a tank which has been generally used in a step for recovering the unreacted monomer in the production of vinyl chloride paste resins, can be used.

The exhaust line 5 is located at the gaseous phase portion of the recovery vessel 1, namely above the liquid surface of the latex in the vessel 1. The exhaust line 5 is usually installed at the top of the vessel 1. The exhaust line 5 is provided with a vacuum pump which is for example a water sealed vacuum pump or a vacuum oil rotary pump, but is not limited so long as a predetermined reduced pressure is achieved.

The latex is supplied to the recovery vessel 1 through latex feed line 3 connected to an upper part of the vessel 1. The latex may be directly supplied to the vessel 1 from a polymerization apparatus, or may be supplied from a storage tank after once transferring the latex from a polymerization apparatus to the storage tank, or may be supplied to vessel 1 after decreasing the unreacted monomer concentration by batchwise stripping of the latex in the polymerization apparatus or the storage tank.

Preferably the latex is introduced into the recovery vessel 1 so as to be sprayed or sprinkled, whereby the residual monomer in the latex is instantaneously stripped. Thus, the stripping apparatus of the present invention may have a means for spraying the fed latex at the end of the latex feed line so as to spray the latex in the vacuum recovery vessel.

The recovery vessel 1 is evacuated. The pressure inside the vessel 1 is adjusted so that water of the latex in the vessel 1 is boiled, that is to say, to a pressure not higher than the water vapor pressure at the temperature of the latex present in the vessel 1. From the viewpoint of removing the unreacted monomer without lowering the mechanical stability of the vinyl chloride paste resin latex and without impairing the quality of the paste resin, it is preferable that the temperature of the latex in the vessel 1 is not more than 80° C., especially less than 80° C., more especially not more than 78° C.

It has been found that the amount of unreacted monomer removed from the vinyl chloride paste resin latex has a close relation to the amount of water boiled and evaporated from the latex in the vessel 1, and the larger the amount of evaporated water, the larger the amount of removal of the monomer. Accordingly, the higher the temperature of the latex to be supplied to the recovery vessel 1 within the range not higher than 80° C., the more preferred. The latex to be supplied to the recovery vessel 1 is maintained at a temperature higher than that of the latex which has been introduced to and is boiling in the recovery vessel 1 maintained under reduced pressure. Preferably, the temperature of the latex to be supplied to the vessel 1 is not lower than 50° C. The inner pressure of the recovery vessel 1 is preferably from 45 to 360 mmHg, more preferably from 55 to 240 mmHg.

In the present invention, the vinyl chloride paste resin latex is heated prior to introducing the latex into vacuum recovery vessel 1. Preferably, the latex is heated just before introducing into the vessel 1 by heat exchanger 12 located in the latex feed line 3 or by introducing steam to the latex feed line 3 from steam feed line 13 connected to the line 3. The amount of heat exchange by heat exchanger 12 or the amount of steam fed is set so that the temperature of the latex to be fed may be elevated within the range of preferably not higher than 80° C. Preferably the latex to be fed is heated at a temperature of 50 to 80° C., especially 60 to 80° C. The latex may be supplied to the recovery vessel 1 from a latex feed tank maintained at a high temperature.

The latex supplied into the recovery vessel 1 may be heated, for example, by jacket 15 provided around the recovery vessel 1, or by introducing steam into the latex in the vessel 1 from steam feed line 18 connected to the bottom of the vessel 1, or by heating the latex circulated in latex circulation line 20 wherein the latex is withdrawn from the vessel 1 by pump 9, heated by heat exchanger 21 provided in the line 20 and/or steam introduced to the line 20 through steam introducing line 22, and then returned to the vessel 1. In case of heating the latex by the jacket 15, the temperature of hot water circulated in the jacket through jacket hot water lines 16 and 17 is not limited so long as it is higher than the inside temperature of the recovery vessel 1, but is preferably from 60 to 80° C. The amount of steam introduced into the recovery vessel 1 is not particularly limited so long as the temperature in the vessel 1 is controllable under a predetermined reduced pressure. In case of heating the latex by circulation, the amount of latex to be circulated and the amount of heating the latex are not particularly limited so long as the temperature in the vessel 1 is controllable under a predetermined reduced pressure. The latex in the recovery vessel 1 is preferably maintained at a temperature of not more than 80° C. If the latex is heated to a temperature higher than 80° C., the latex may be coagulated.

The latex in the vessel 1 may be agitated by agitating vane 19. The latex in the vessel 1 is recovered from a lower part, e.g., bottom, of the vessel 1 through latex recovery line 4.

In the present invention, foam of the latex which has overflowed into the vacuum exhaust line 5 during the stripping is destroyed by contacting with steam in a pipe of the line 5 and/or a foam separator 2. The temperature of steam is not particularly limited so long as it is not lower than the saturated water vapor temperature in the vacuum recovery vessel 1 so that steam can be introduced without condensation into the pipe of the line 5 and/or the foam separator 2 through defoaming steam feed line 6. The steam is maintained preferably at a temperature higher than the saturated water vapor temperature in the vacuum recovery vessel 1 and, under consideration of heat stability of the latex, more preferably at a temperature higher than the saturated water vapor temperature in the recovery vessel 1 by 10 to 50° C.

Foam separator 2 is installed in the vacuum exhaust line 5. As the separator 2 can be used any containers so long as they are resistant to pressure reduction to several mmHg. The volume of the separator 2 is not limited so long as it can temporarily receive latex foam and latex partly scattered from the recovery vessel 1. The volume of the separator 2 is usually from 1/20 to 1/5 of the volume of the recovery vessel 1.

Since it is desirable that the pressure loss between foam separator 2 and vacuum recovery vessel 1 is small, it is preferable to install the foam separator 2 at a location near the recovery vessel 1. It is also preferable that the diameter of a pipe of the vacuum exhaust line located between the foam separator 2 and the recovery vessel 1 is large.

Preferably, the vinyl chloride paste resin latex that has run down in foam separator 2 is returned to vacuum recovery vessel 1 without being stayed or stored in the separator 2, since the latex may be boiled again to generate foam if it is allowed to stand in the separator 2. For the purpose of returning, the bottom of the separator 2 is preferably in the shape of 2:1 semi elliptic, more preferably in the conical shape, although any shape capable of withdrawing the latex from the separator 2 is acceptable.

Line 11 for returning the latex from foam separator 2 to vacuum recovery vessel 1 is preferably connected to the bottom of the separator 2. A thicker pipe is preferred for the line 11. As the position to which the latex is returned, any position of the recovery vessel 1 is acceptable if the returned latex does not directly scatter into the vacuum exhaust line 5. The latex is returned to the vessel 1 preferably at a location below the liquid surface of the latex in the vessel 1, more preferably to the bottom of the vessel 1. As to the manner of returning the latex to the vessel 1, pump 10 for returning the latex may be installed in the latex returning line 11 and the latex may be forcibly returned by the pump 10, or the height, direction and distance between the foam separator 2 and the liquid level of the latex in the vessel 1 may be suitably adjusted to return the latex by a pressure difference. In the latter case, the latex returning pump 10 installed in the returning line 11 may be used as assistant.

The method as explained above is effective for continuously stripping unreacted monomer from a vinyl chloride paste resin latex. When foam scatters from the foam separator 2 into vacuum exhaust line 8 connected to a vacuum pump for exhaust because of vigorous foam generation, it is possible to reduce the pumping speed to prevent the foam from scattering into the exhaust line 8, while promoting discharge of the latex from the foam separator 2 to return the latex to the recovery vessel 1. In that case, it is preferable to increase the pumping speed again to return normal operation when most of the foam and latex in the separator 2 have been returned to the recovery vessel 1. Although scattering of foam toward the vacuum pump through the exhaust line 8 generally compels to stop the operation of the apparatus in order to avoid trouble of the apparatus, decrease in ability of the vacuum pump and the like, the labor and time for stopping and starting up the apparatus can be saved by the above operation since it is not needed to stop the operation of the apparatus.

A defoaming agent may be added to a latex to be treated through line 14, and/or may be added to foam separator 2 through line 7 connected to the top of separator 2, as occasion demands.

By the method for stripping unreacted monomer from a vinyl chloride paste resin latex and the stripping apparatus according to the present invention, defoaming can be achieved without deteriorating the quality of the vinyl chloride paste resin and without lowering the productivity and vacuum stripping can be continuously performed. Since the latex is supplied to a vacuum recovery vessel, wherein the latex that stays therein is subjected to a boiling treatment, under such a condition that the temperature of the latex to be supplied is higher than the boiling treatment temperature in the vessel, the unreacted monomer can be recovered in a short period of time in a high efficiency. Also, the apparatus can be miniaturized. The production of vinyl chloride paste resins from the latex obtained by the method of the present invention or by using the apparatus of the present invention is favorable from an environmental point of view, since the amount of unreacted monomer discharged when drying the latex to obtain the paste resin therefrom can be hold down.

The present invention is more specifically described and explained by means of the following examples, but it is to be understood that the present invention is not limited to these examples.

In the Examples and Comparative Examples, measurement and evaluation were made according to the following methods.

Operability of Vacuum Stripping Treatment (Defoaming)

The operability was determined by the presence or absence of foam scattering from a foam separator into an exhaust line connected to a vacuum pump for exhaust, which was observed through a site glass provided in the exhaust line located between the foam separator and the vacuum pump. The state of filling with foam in the foam separator was also observed through a site glass provided in an upper part of the side wall of the foam separator. The operability was evaluated according to the following criteria.

○: Foam in the foam separator is destroyed and the stripping can be continuously operated without foam flowing from the separator into the exhaust line connected to vacuum pump.

Δ: The foam separator may be sometimes filled with foam, but by reducing the pumping speed for exhaust at that time, the stripping can be continuously operated without overflow of foam from the separator into the exhaust line connected to vacuum pump.

×: The foam separator is filled with foam and the foam overflows from the foam separator into the exhaust line connected to vacuum pump.

Concentration of Residual Vinyl Chloride Monomer in PVC Paste Resin Latex

The concentration of residual vinyl chloride monomer in a polyvinyl chloride paste resin latex was measured according to a known method using a gas chromatograph by weighing out 2 g (on dry basis) of the paste resin latex, dissolving it in 40 ml of tetrahydrofuran with stirring, injecting 0.5 ml of the obtained solution into a gas chromatograph (model GC14-14A made by Shimadzu Corporation), and determining the concentration of residual vinyl chloride monomer according to a hydrogen ion detecting method. The measured vinyl chloride monomer concentration was calculated to a value per weight of the solid matter of the paste resin latex. The calculated value is shown as the concentration of residual vinyl chloride monomer in polyvinyl chloride paste resin latex.

Quality of PVC Paste Resin

A latex after stripping treatment was subjected to wet sieving through a 100 mesh wire net having an opening diameter of 150 μm, and the quality of polyvinyl chloride paste resin was evaluated by the proportion of coarse particles having a size of not less than 100 meshes based on the dry weight of the resin. It is generally recognized that the proportion of coarse particles having a size of not less than 100 meshes which would introduce a problem in quality, is 0.5% or more.

EXAMPLE 1

A 1.2 m$^3$ dispersing tank equipped with a stirrer was charged with 390 kg of deionized water. Thereto were then added an aqueous solution of an emulsifier prepared by dissolving 2.7 kg of sodium lauryl sulfate and 2.7 kg of cetyl alcohol in 60 kg of deionized water at 80° C. and cooled to room temperature and a polymerization initiator solution of 207 g of α,α'-azobisisobutyrovarelonitrile (ABVN) dissolved in 0.5 liter of toluene. After evacuating the tank for 10 minutes, 450 kg of vinyl chloride monomer was charged into the tank and was uniformly dispersed with stirring for 60 minutes while circulating the mixture through a centrifugal pump having an ability of 10 m$^3$/hour. The resulting uniform dispersion was then transferred by a pump from the dispersing tank to a 1.2 m$^3$ stainless steel polymerization reactor equipped with a stirrer. The inner pressure of the reactor was then raised with nitrogen gas by 1 kg/cm$^2$ and the temperature was elevated to 50° C. with stirring to perform the polymerization. When the inner pressure dropped to 6.5 kg/cm$^2$G, the temperature was elevated to 70° C. and the reaction mixture was further kept at that temperature for 30 minutes. The unreacted vinyl monomer was then removed under reduced pressure in the polymerization reactor to give a polyvinyl chloride paste resin latex having a solid concentration of 45% by weight.

The obtained latex had an unreacted monomer concentration of 4,000 ppm and a proportion of coarse particle having a size of not less than 100 meshes of 0.01%.

The obtained PVC paste resin latex was then charged in a feed tank and kept at 60° C. The latex was continuously fed at a rate of 20 liters/hour to a vacuum recovery vessel kept at 90 mmHg through a latex feed line located at an upper part of the recovery vessel. The pipe of the latex feed line had a diameter of 0.01 m, and the flow rate of the latex fed was about 0.07 m/second. The amount of the latex in the recovery vessel was controlled to 10 liters, and the latex was continuously taken out of a latex recovery line located at a lower part of the recovery vessel at a rate of 20 liters/hour. The average residence time of the latex in the recovery vessel was 0.5 hour. The latex in the recovery vessel was heated by a jacket which was located around the recovery vessel and through which hot water of 60° C. was passed at a rate of 120 liters/hour. As the vacuum recovery vessel was used a pressure vessel having a diameter of 0.22 m and a height of 0.44 m, the top and bottom of which were in a 2:1 semi elliptic shape.

The vacuum recovery vessel was connected by an exhaust line pipe having an inner diameter of 0.04 m and a length of 0.30 m to a foam separator which was a pressure vessel having a diameter of 0.10 m and a height of 0.20 m, the top and bottom of which were in a 2:1 semi elliptic shape. During the stripping treatment, steam of 80° C. was fed at a rate of 0.8 kg/hour to the exhaust line pipe located between the recovery vessel and the foam separator from a steam feed line connected to the exhaust line pipe to destroy foam which entered the exhaust line pipe from the recovery vessel. The resulting latex which was formed as a result of defoaming and had run down to the bottom of the foam separator was discharged by a tube pump so as not to stay at the bottom of the separator and was returned to the vacuum recovery vessel.

The recovery of the unreacted monomer stripped from the latex was performed from a vacuum exhaust line located at the top of the foam separator. No foam which scattered from the foam separator to the vacuum exhaust line was observed. Thus, continuous stripping treatment was possible.

The unreacted monomer concentration of the latex continuously recovered by a tube pump through the latex recovery line was 400 ppm based on the solid matter of the recovered latex. Also, the proportion of coarse particles having a size of not less than 100 meshes in the treated latex was 0.01% and was the same as that of the latex prior to the stripping treatment.

The results are shown in Table 1.

EXAMPLE 2

The stripping treatment of the latex was carried out in the same manner as in Example 1 except that the temperature of steam introduced for defoaming to the steam feed line connected to the exhaust line located between the recovery vessel and the foam separator was 120° C.

No foam which scattered from the foam separator to the vacuum exhaust line connected to an exhaust vacuum pump was observed. Thus, continuous stripping treatment was possible.

The unreacted monomer concentration of the latex continuously recovered by a tube pump through the latex recovery line was 400 ppm based on the solid matter of the recovered latex. Also, the proportion of coarse particles having a size of not less than 100 meshes in the treated latex was 0.04% that was on the level causing no problem in quality.

The results are shown in Table 1.

COMPARATIVE EXAMPLE 1

The stripping treatment of the latex was carried out in the same manner as in Example 1 except that steam was not introduced to the exhaust line located between the vacuum recovery vessel and the foam separator.

Foam vigorously scattered from the recovery vessel to the foam separator and overflowed from the separator to be entrained to the vacuum exhaust line connected to an exhaust vacuum pump. Since the vacuum pump would be damaged, the operation was stopped.

The results are shown in Table 1.

COMPARATIVE EXAMPLE 2

The stripping treatment of the latex was carried out in the same manner as in Example 1 except that steam was not introduced to the exhaust line located between the vacuum recovery vessel and the foam separator and a silicone defoaming agent was continuously introduced from the steam feed line to the exhaust line in an amount of 100 ppm based on the solid matter of the latex.

Foam vigorously scattered from the recovery vessel to the foam separator and overflowed from the separator to be entrained to the vacuum exhaust line connected to an exhaust vacuum pump. Since the vacuum pump would be damaged, the operation was stopped.

The results are shown in Table 1.

COMPARATIVE EXAMPLE 3

The stripping treatment of the latex was carried out in the same manner as in Example 1 except that steam was not introduced to the exhaust line located between the vacuum recovery vessel and the foam separator, and a silicone defoaming agent was continuously introduced to the latex feed line from a feed pipe installed therein and to the exhaust line from the steam feed pipe installed therein in amounts of 50 ppm and 50 ppm (100 ppm in total) based on the solid matter of the latex.

Foam vigorously scattered from the recovery vessel to the foam separator and overflowed from the separator to be entrained to the vacuum exhaust line connected to an exhaust vacuum pump. Since the vacuum pump would be damaged, the operation was stopped.

The results are shown in Table 1.

EXAMPLE 3

The stripping treatment of the latex was carried out in the same manner as in Example 1 except that the temperature of steam introduced for defoaming to the steam feed line connected to the exhaust line located between the recovery vessel and the foam separator was 55° C.

The foam separator was sometimes ready to be filled with foam during the stripping. At that time, the pumping speed was decreased by throttling a valve provided in the vacuum exhaust line located between the separator and the vacuum pump, and after confirming that the foam filled in the separator was destroyed and the resulting latex was well discharged, the pumping speed was returned by throttling back the valve. As a result of such an operation, there was no scattering of foam from the foam separator to the vacuum exhaust line connected to an exhaust vacuum pump, and continuous stripping treatment was possible.

The unreacted monomer concentration of the latex continuously recovered by a tube pump through the latex recovery line was 400 ppm based on the solid matter of the recovered latex. Also, the proportion of coarse particles having a size of not less than 100 meshes in the treated latex was 0.01% and was the same as that of the latex prior to the stripping treatment.

The results are shown in Table 1.

EXAMPLE 4

The stripping treatment of the latex was carried out in the same manner as in Example 1 except that the latex fed from the feed tank kept at 60° C. was heated to 65° by a heat exchanger installed in the latex feed line before introducing the latex into the vacuum recovery vessel.

No foam which scattered from the foam separator to the vacuum exhaust line connected to an exhaust vacuum pump was observed. Thus, continuous stripping treatment was possible.

The unreacted monomer concentration of the latex continuously recovered by a tube pump through the latex recovery line was 240 ppm based on the solid matter of the recovered latex. Also, the proportion of coarse particles having a size of not less than 100 meshes in the treated latex was 0.01% and was the same as that of the latex prior to the stripping treatment.

The results are shown in Table 1.

EXAMPLE 5

The stripping treatment of the latex was carried out in the same manner as in Example 1 except that the latex fed from the feed tank kept at 60° C. was heated to 65° by bringing into contact with steam in the latex feed line before introducing the latex into the vacuum recovery vessel. The steam was introduced into the latex feed line pipe through a steam feed line pipe connected thereto in such an amount that the ratio of steam to the latex was 1:20 by weight.

No foam which scattered from the foam separator to the vacuum exhaust line connected to an exhaust vacuum pump was observed. Thus, continuous stripping treatment was possible.

The unreacted monomer concentration of the latex continuously recovered by a tube pump through the latex recovery line was 240 ppm based on the solid matter of the recovered latex. Also, the proportion of coarse particles having a size of not less than 100 meshes in the treated latex was 0.01% and was the same as that of the latex prior to the stripping treatment.

The results are shown in Table 1.

EXAMPLE 6

The stripping treatment of the latex was carried out in the same manner as in Example 1 except that the latex fed from the feed tank kept at 60° C. was heated to 70° by bringing into contact with steam in the latex feed line before introducing the latex into the vacuum recovery vessel. The steam was introduced into the latex feed line pipe through a steam feed line pipe connected thereto in such an amount that the ratio of steam to the latex was 3:40 by weight.

No foam which scattered from the foam separator to the vacuum exhaust line connected to an exhaust vacuum pump was observed. Thus, continuous stripping treatment was possible.

The unreacted monomer concentration of the latex continuously recovered by a tube pump through the latex recovery line was 160 ppm based on the solid matter of the recovered latex. Also, the proportion of coarse particles having a size of not less than 100 meshes in the treated latex was 0.01% and was the same as that of the latex prior to the stripping treatment.

The results are shown in Table 1.

EXAMPLE 7

The stripping treatment of the latex was carried out in the same manner as in Example 5 except that the latex staying in the vacuum recovery vessel was brought into contact with steam by introducing the steam into the recovery vessel at a rate of 1.0 kg/hour from a steam feed line installed at the bottom of the recovery vessel.

No foam which scattered from the foam separator to the vacuum exhaust line connected to an exhaust vacuum pump was observed. Thus, continuous stripping treatment was possible.

The unreacted monomer concentration of the latex continuously recovered by a tube pump through the latex recovery line was 120 ppm based on the solid matter of the recovered latex. Also, the proportion of coarse particles having a size of not less than 100 meshes in the treated latex was 0.01% and was the same as that of the latex prior to the stripping treatment.

The results are shown in Table 1.

TABLE 1

| | Treating Conditions | | | | | |
|---|---|---|---|---|---|---|
| | Temperature of latex in recovery vessel | Temperature of fed latex | Temperature of steam fed for defoaming | Defoaming | Residual monomer concentration of treated latex | Amount of coarse particles |
| Ex. 1 | 50° C. | 60° C. | 80° C. | ○ | 400 ppm | 0.01% |
| Ex. 2 | 50° C. | 60° C. | 120° C. | ○ | 400 ppm | 0.04% |
| Ex. 3 | 50° C. | 60° C. | 55° C. | Δ | 400 ppm | 0.01% |
| Ex. 4 | 50° C. | 65° C. | 80° C. | ○ | 240 ppm | 0.01% |
| Ex. 5 | 50° C. | 65° C. | 80° C. | ○ | 240 ppm | 0.01% |
| Ex. 6 | 50° C. | 70° C. | 80° C. | ○ | 160 ppm | 0.01% |
| Ex. 7 | 50° C. | 65° C. | 80° C. | ○ | 120 ppm | 0.01% |
| Com. Ex. 1 | 50° C. | 60° C. | — | X | — | — |
| Com. Ex. 2 | 50° C. | 60° C. | — | X | — | — |
| Com. Ex. 3 | 50° C. | 60° C. | — | X | — | — |

What we claim is:

1. A method for continuously stripping an unreacted monomer from a latex of a vinyl chloride paste resin, comprising the steps of continuously supplying a vinyl chloride paste resin latex from a latex feed line to a vacuum recovery vessel maintained under reduced pressure, the temperature of said latex to be supplied being higher than that of said latex which has been introduced to and present in said recovery vessel, boiling said latex in said recovery vessel under said reduced pressure, withdrawing a monomer gas generated in said recovery vessel through an exhaust line which is connected to the upper part of said recovery vessel and is provided with a foam separator, bringing a foam, which has generated in and overflowed from said recovery vessel toward said foam separator through said exhaust line, into contact with steam introduced to said foam separator and/or a pipe of said exhaust line, thereby destroying said foam, returning the resulting vinyl chloride paste resin latex in said foam separator to said recovery vessel, and continuously withdrawing the vinyl chloride paste resin latex from said recovery vessel.

2. The method of claim 1, wherein the pressure in said vacuum recovery vessel is from 55 to 240 mmHg.

3. The method of claim 1, wherein said steam introduced to said foam separator and/or a pipe of said exhaust line has a temperature higher than that of the saturated water vapor in said recovery vessel.

4. The method of claim 1, wherein said steam introduced to said foam separator and/or a pipe of said exhaust line has a temperature higher than the saturated water vapor temperature in said recovery vessel by 10 to 50° C.

5. The method of claim 1, wherein said steam to be contacted with said overflowing foam is introduced to a pipe of said exhaust line located between said recovery vessel and said foam separator.

6. The method of claim 1, wherein the exhaust velocity in a pipe of said exhaust line located between said foam separator and an exhaust pump provided to withdraw the monomer gas from said foam separator is decreased when said foam separator is filled with the foam.

7. The method of claim 1, wherein said latex to be supplied to said vacuum recovery vessel is heated by a heat exchanger provided in said latex feed line.

8. The method of claim 1, wherein said latex to be supplied to said vacuum recovery vessel is heated at a temperature of not more than 80° C. by a heat exchanger provided in said latex feed line.

9. The method of claim 1, wherein said latex to be supplied to said vacuum recovery vessel is heated by introducing a reduced pressure steam to said latex feed line.

10. The method of claim 1, wherein said latex to be supplied to said vacuum recovery vessel is heated at a temperature of not more than 80° C. by introducing steam to said latex feed line.

11. The method of claim 1, wherein said latex in said recovery vessel is heated by a jacket provided to said recovery vessel.

12. The method of claim 1, wherein said latex in said recovery vessel is heated by introducing steam to said recovery vessel.

13. The method of claim 1 wherein said latex in said vacuum recovery vessel is withdrawn therefrom, heated by contact with steam and/or by a heat exchanger, and then returned to said recovery vessel.

14. A method for continuously stripping an unreacted monomer from a latex of a vinyl chloride paste resin, comprising the steps of heating a vinyl chloride paste resin latex, continuously supplying said heated latex to a vacuum recovery vessel maintained under reduced pressure, boiling said latex in said recovery vessel, withdrawing a monomer gas generated in said recovery vessel through an exhaust line which is connected to the upper part of said recovery vessel and is provided with a foam separator, bringing a foam, which has generated in and overflowed from said recovery vessel toward said foam separator through said exhaust line, into contact with steam introduced to said foam separator and/or a pipe of said exhaust line, thereby destroying said foam, returning the resulting vinyl chloride paste resin latex in said foam separator to said recovery vessel, and continuously withdrawing the vinyl chloride paste resin latex from said recovery vessel.

* * * * *